Nov. 12, 1935.  G. BONAME ET AL  2,020,295
THERMIC REGULATOR FOR ELECTRIC CIRCUITS
Original Filed Jan. 25, 1929   3 Sheets-Sheet 1
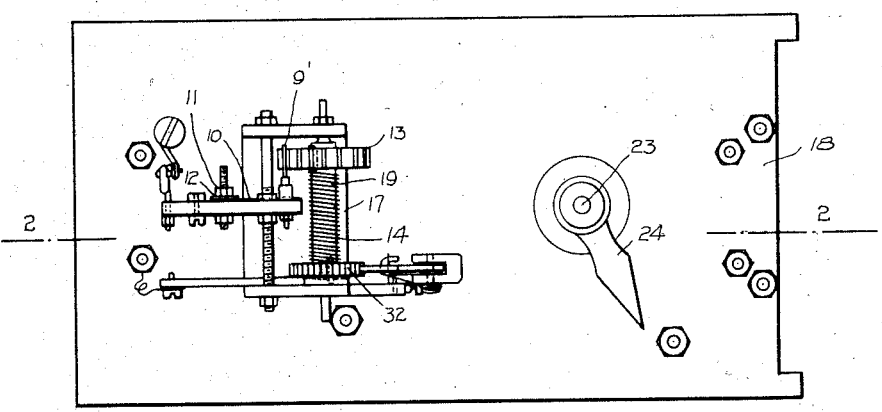
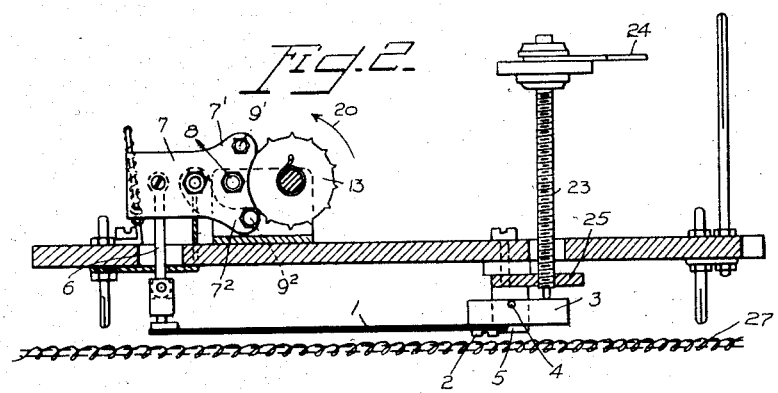
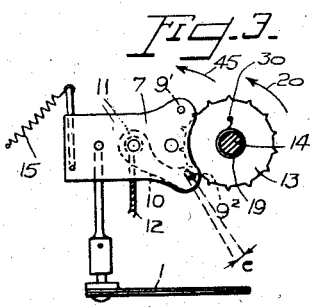
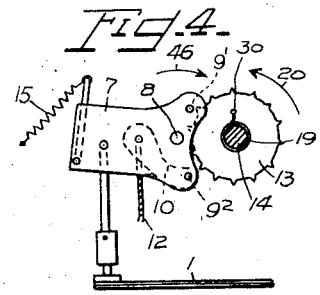
Georges Boname
Albert Munerelle
INVENTORS
BY
their ATTORNEY.

Nov. 12, 1935.   G. BONAME ET AL   2,020,295
THERMIC REGULATOR FOR ELECTRIC CIRCUITS
Original Filed Jan. 25, 1929   3 Sheets-Sheet 2
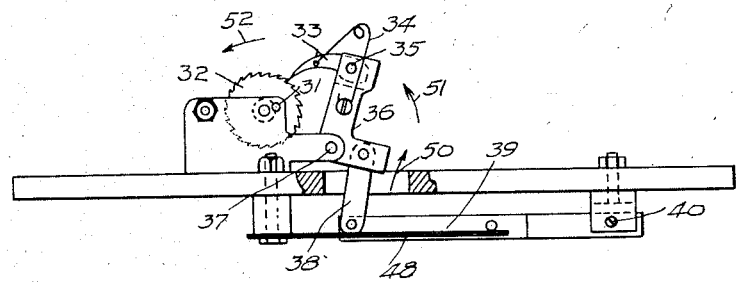
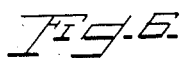
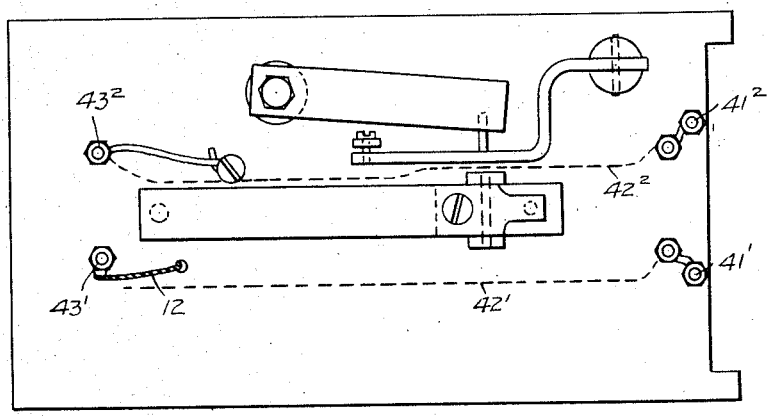
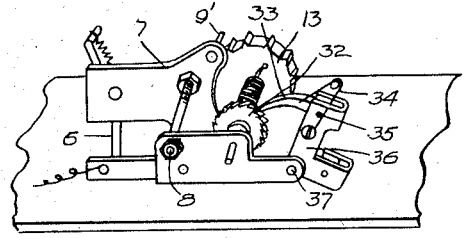
Georges Boname
Albert Munerelle
INVENTORS
BY
their ATTORNEY Nov. 12, 1935.   G. BONAME ET AL   2,020,295
THERMIC REGULATOR FOR ELECTRIC CIRCUITS
Original Filed Jan. 25, 1929   3 Sheets-Sheet 3
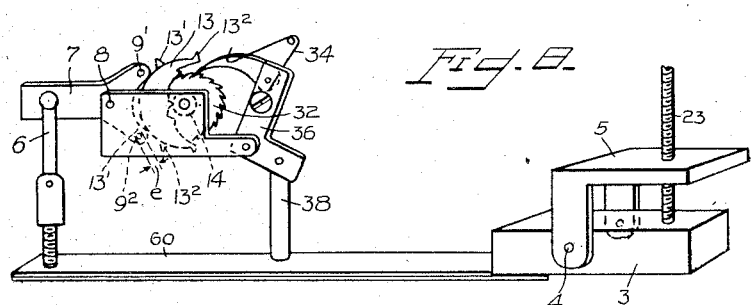
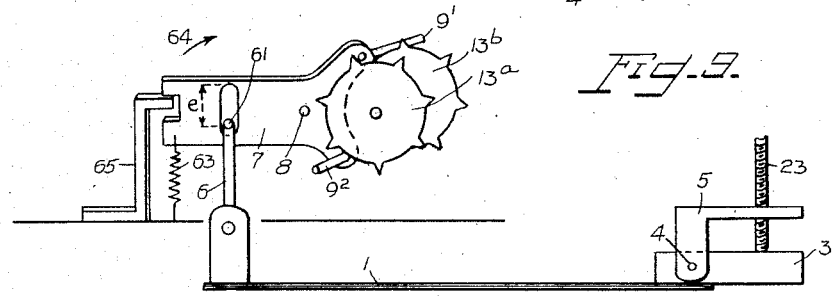
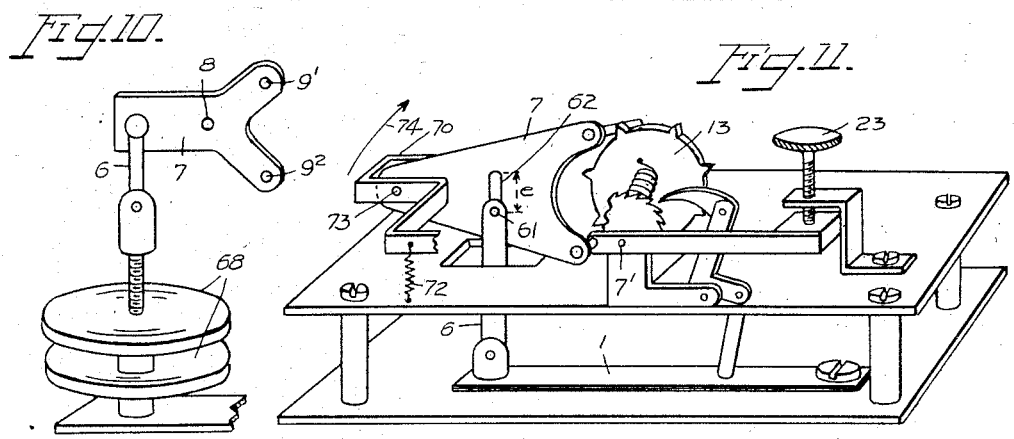
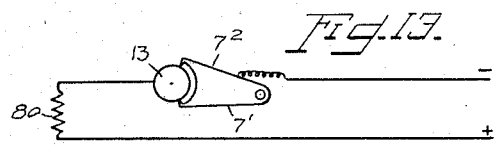
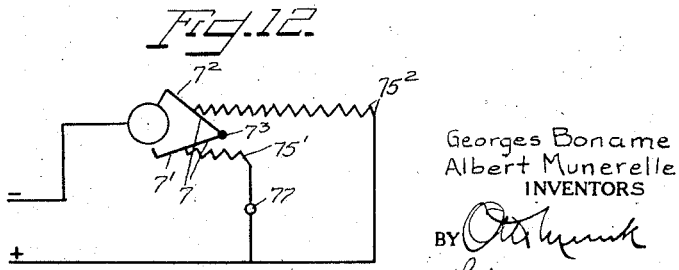
Georges Boname
Albert Munerelle
INVENTORS
BY
their ATTORNEY.

UNITED STATES PATENT OFFICE 2,020,295

THERMIC REGULATOR FOR ELECTRIC CIRCUITS

Georges Boname and Albert Munerelle, Paris, France, assignors, by mesne assignments, to United States Holding Corporation, a corporation of Delaware Application January 25, 1929, Serial No. 334,908. Renewed December 1, 1933. In France October 15, 1928

10 Claims. (Cl. 200—139)

The present invention relates to improvements in thermic regulators for electric circuits, in such manner as to simplify their construction as much as possible, to reduce the cost, and afford an abrupt action when the temperature attains the desired maximum.

The invention has further for its object to provide a thermic regulator for electric circuits which is adapted for an easy regulating of the temperature at which the apparatus is to be released.

A thermic regulator for electric circuits by which the above mentioned objects will be attained, offers the several features which will be disclosed in the following description and appended claims.

Thermic regulators for electric circuits are shown by way of example in the accompanying drawings, in which:

Fig. 1 is a plan view of the regulator as employed with an electric flat iron.

Fig. 2 is a section of said regulator on the line 2—2 of Fig. 1.

Figs. 3 and 4 are two elevational views of the movable anchor and of the escapement wheel in two different positions, one corresponding to the closing and the other to the opening of the electric circuit.

Fig. 5 is a side view of the automatic winding device.

Fig. 6 is a bottom view of the regulator.

Fig. 7 is a perspective view of the devices shown in Figs. 1 to 6.

Figs. 8 and 9 are two elevational views of two respective modifications.

Fig. 10 is a partial perspective view of another modification.

Fig. 11 is a perspective view of another modification.

Figs. 12 and 13 are two diagrams corresponding to two arrangements of circuits for the regulator according to the invention.

The regulator shown in Figs. 1 to 7 consists essentially of elements for opening and closing an electric circuit, a mechanism for winding up these elements, and suitable regulating means.

A member which is subject to deformation under the action of heat, for instance a bi-metallic strip 1, is secured at one end 2 to an oscillating block 3 which is pivoted at 4 in a forked hanging bracket 5. The said strip 1 is mounted above the electric heating resistances 27.

A regulating screw 23 provided with a pointer 24 is screwed into an extension 25 of the bracket 5, so that by turning the screw 23 in one direction or the other it is possible to change the initial position of the oscillating block 3 and the strip 1, and hence the temperature corresponding to the release of the regulator.

The thermo-responsive strip 1 is connected at its outer end, by a link 6, to a lever 7 pivoting on a shaft 8. The lever consists of an insulating substance such as ebonite, and has two branches $7^1$—$7^2$, each carrying a contact member $9^1$—$9^2$. The contact member $9^1$ which is simply secured in the lever 7, is thus electrically insulated and is connected by a conducting plate 11 to a conductor 12.

A resilient member or spring 15 tends to maintain the lever 7 normally in the position shown in Fig. 2, in which the pin $9^2$ is in contact with one of the teeth of an escapement wheel 13. In these conditions, the current can flow through the circuit 12—11—10—13 (Figs. 2 and 3), but the circuit will be broken if the said anchor takes the position shown in Fig. 4, since the pin $9^2$ is now out of contact with the wheel 13, and only the insulated pin $9^1$ is in contact with a tooth of the wheel.

The escapement wheel 13 is loose on an axle 14 parallel to the shaft 8 of the lever 7, said shaft and axle being both mounted in a support 17 consisting of a metallic member of U shape, secured to the base plate 18 of the regulator.

A spring 19 which surrounds the axle 14 and is attached at 30 to the escapement wheel 13, tends to rotate said wheel counter-clockwise as indicated by the arrow 20, and the spring thus exercises an effort in such manner as to hold a tooth of the wheel 13 strongly against the pin $9^2$ (Fig. 3) thus making a good electric contact between these two metal parts.

The spring 19 is combined with an automatic winding device. For this purpose the said spring engages at its end 31 with a ratchet wheel 32 which is loose on the axle 14 and is driven by a pawl 33. The said pawl, which is held in the suitable position by a spring 34, is pivoted at 35 to the forked end of an actuating lever 36, said lever being pivoted at 37 and connected by a link 38 to a lever 39 pivoting on an axle 40 and urged by a second bi-metallic or thermoresponsive strip 48 bending under the action of heat.

The flow of current is assured by the two terminals $41^1$—$41^2$ connecting the regulator to the supply circuit, these two terminals being in turn connected by respective wires $42^1$—$42^2$ to two respective intermediate terminals $43^1$—$43^2$ whereof one is connected by the conductor 12 to the metallic support 10 of the lever 7 and the other to the metallic support 17 and hence to the escapement wheel 13.

The said regulator operates in the following manner. In the case of the normal heating, the several parts of the regulator have the positions shown in Figs. 2 and 3. The pin $9^2$ of the lever 7 is firmly held against a tooth of the escapement wheel 13 by the action of the spring 15 which tends to turn the lever 7 according to 45, and also of the spring 19 which tends to turn the escapement wheel 13 according to 20. This will produce a good electric contact between these two parts, and the current flows through the closed circuit $41^1$—$42^1$—$43^1$—12—11—10—$9^2$—13—14—17—$43^2$—$42^2$—$41^1$ and the heating resistances 27, and in this manner the heating regularly continues.

If the temperature becomes excessive, the strip 1 will bend (Fig. 4) thus pivoting the lever 7 on the shaft 8 according to 46. The pin $9^2$ is thus released from the teeth of the escapement wheel 13 which, under the action of its spring 19, suddenly turns according to 20, until another tooth comes against the pin $9^1$, thus stopping the escapement wheel.

This affords a quick break of the circuit, since the tooth of the escapement wheel 13 will be rapidly separated from the pin $9^2$ under the strong action of the spring 19. This obviates all sparking, and the circuit is properly opened.

The second metal strip 48 will also bend under the action of heat, and it moves the lever 39 which turns according to 50 (Fig. 5) drawing with it the lever 36, according to 51. The lever 36 actuates the pawl 33 and turns the ratchet wheel 32 according to 52. To recapitulate, the spring 19 is attached at its respective ends to the wheels 13 and 32, which after each release, will have turned through the same angle, so that the tension of the spring remains constant, and the spring is thus always ready to actuate the escapement wheel 13 without requiring any adjustment from the outside.

When the temperature has resumed to the normal value, the strip 1 returns from the form shown in Fig. 4 to the form shown in Fig. 3. The reaction spring 15 facilitates this return, and it turns the lever according to 45. The anchor thus returns to the initial position (Fig. 3) and its pin $9^2$ again makes contact with a tooth of the escapement wheel 13 and closes the circuit of the electric heating resistances 27, as above stated.

It will be noted that the escapement wheel 13 will always rotate in the same direction, both for the opening and the closing of the electric circuit.

The release temperature is regulated in a very simple manner. It is simply necessary to turn the screw 23 in the proper direction, and when proceeding in its nut 25 it changes the position of the oscillating block 3 and hence the position of the strip 1, the link 6 and the lever 7. This adjusts the amount of contact $e$ between the pin $9^2$ and the tooth of the wheel 13, and hence the inoperative angle covered by the lever 7 before breaking the circuit. In this manner the release temperature of the regulator can be accurately and simply adjusted.

The apparatus herein described by way of example is susceptible of numerous modifications. In particular, the two bi-metallic strips 48 may be replaced by a single strip 60 (Fig. 8.). The strip carries at one end a link 5 assuring the connection between the said strip 60 and the pivoting lever 7 provided with the escapement pins $9^1$—$9^2$, and the said strip also carries at the middle a second link 38, which as above stated assures the control of the driving lever 36, the pawl 33 and the ratchet wheel 32. This automatically winds up the spring 14 actuating the escapement wheel 13.

The strip 60 is mounted on a block 3 pivoting on an axle 4 mounted on the forked bracket 5. The said bracket also serves as a nut for the regulating screw 23, so that by turning the screw more or less, this will regulate the amount of contact $e$ between the pin $9^2$ and the tooth of the wheel 13 and hence the inoperative angle covered by the lever 7 before the circuit is broken. In this manner the releasing temperature of the regulator can be adjusted.

In the constructional forms herein represented, it is supposed that the pin $9^2$ is connected to the electric circuit by a conducting plate 10 and that the pin $9^1$ is insulated. However, this arrangement can be variously modified. As shown in Fig. 8, the lever 7 may consist of a conducting substance, and the escapement wheel 13 may carry the insulating teeth $13^1$ and the conducting teeth $13^2$ in alternate position, and the electric circuit is thus automatically opened and closed according as the lever 7 is engaged by its pins $9^1$—$9^2$ with an insulating tooth $13^1$ or a conducting tooth $13^2$.

The modification shown in Fig. 9 comprises two escapement wheels $13a$—$13b$ wherein one is conducting and the other insulated. These two wheels are secured together, but their teeth are relatively displaced. In this construction the lever 7 consists entirely of conducting material. The circuit is alternately closed according as the lever 7 engages the conducting escapement wheel $13a$ or the insulating escapement $13b$.

The modification shown in Fig. 9 also comprises a modified device for the adjustment of the releasing temperature of the regulator, and herein the link 6 actuated by the thermoresponsive strip 1 carries a driving stud 21 slidable in a slot 62 of the lever 7 engaging the escapement wheel 13 by means of its two pins $9^1$—$9^2$.

The lever 7 is also urged by a spring 63 and it makes contact under the action of said spring with a fixed stop 65 limiting the oscillations of the said anchor in either direction.

The strip 1 is mounted upon a block 3 pivoting on the shaft 4 and controlled by the regulating screw 23. The said screw is turned to regulate the initial position of said strip 1 and hence the inoperative distance $e$ covered by the stud 61 in the slot 62 before it attains the end of said slot and drives the lever 7 according to 64. When the temperature decreases, the spring 63 turns the lever in the opposite direction to 64, and at the end of its stroke the lever makes contact with the stop 64. This constitutes a device for regulating the releasing temperature by oscillations of the anchor which are limited in both directions.

In all of the aforesaid regulators, the element which is subject to deformation by heat is a two-metal strip 1, 60. However, the said invention obviously relates to all such regulators as described, irrespective of the nature of this element subject to deformation, and chiefly in the case of moderate temperatures, the said element may consist of superposed recipients 68 (Fig. 10) containing liquid.

In the regulating devices above described, and chiefly in the one shown in Fig. 9, it is supposed that the member 23 for regulating the releasing temperature acts upon the thermoresponsive strip 1, thus modifying the initial position of said strip with reference to the pivoting lever 7.

On the contrary, in the modification shown in Fig. 11, the regulating member 23 acts upon the end of a frame 70 pivoted on a shaft 71 urged by a reaction spring 72 and carrying the lever 7, which is pivotally mounted on a shaft 73 mounted on the frame 70. The lever 7 has a guide slot 62 in which is engaged a tenon 61 formed at the end of a link 6 mounted on the element 1 which is subject to deformation. The screw 23 can be turned to rotate the frame 70 and the lever 7 on the shaft 71, thus changing the inoperative stroke $e$ and hence the temperature at which the apparatus is released.

In the preceding examples, it has been supposed that the lever 7, by its alternate oscillation, causes the closing and the opening of a circuit according to the positions assumed by said lever relative to the escapement wheel 13. However, the invention covers all regulators as above described, even in the case in which the lever 7, instead of alternately opening and closing the circuit, serves to alternately close one or the other of two branches of a given circuit.

The diagram shown in Fig. 12 indicates one such arrangement. The circuit comprises two branches $75^1$—$75^2$ connected respectively to the branches $7^1$—$7^2$ of the lever 7. Both branches are conducting, and they are separated from one another by an insulating portion $7^3$.

The regulator as a whole is of the same type as the one described with reference to Figs. 1 to 7.

The position of the anchor with reference to the escapement wheel 13, under the action of the said element subject to deformation, determines the closing of one or the other of the branches $75^1$—$75^2$.

This arrangement will therefore permit to automatically modify the resistances in circuit, and it is also feasible to proceed from a great heat to a greatly reduced heat, by a suitable choice of the resistances disposed in the branches $75^1$—$75^2$.

It is also practicable to mount in one of the said branches, such as $75^1$, an indicating or signal device, for instance an electric lamp 77, which shows at once the position of the lever 7 and the state of the circuit.

The arrangement shown in Fig. 12 also permits to connect the different phases of a polyphase current on the separate branches $7^1$—$7^2$ of the lever 7, in order to alternately cut off one or another phase of this current.

In the preceding examples, the regulator is supposed to be mounted directly in the main electric circuit, this being suitable for small currents, but in the case of large currents, the regulator can be disposed in a circuit operating a relay 80 which controls the main circuit.

What is claimed is:

1. An electric circuit controlling device comprising an escapement mechanism having a power unit, means actuated by said escapement mechanism for controlling the flow of current through a circuit, thermo-responsive means for controlling the operation of said escapement mechanism, and thermo-responsive means for maintaining the power unit of said escapement mechanism active.

2. An electric circuit controlling device comprising an escapement wheel and an escapement lever associated therewith, means tending to rotate said wheel, said lever being successively movable with respect to said escapement wheel in two alternative positions, means responsive to said alternative movements of said lever for opening and closing an electric circuit, and a thermo-responsive device for controlling the movement of said lever and reenergizing the means tending to rotate the escapement wheel.

3. A circuit controlling device comprising an escapement mechanism including an escapement wheel and an escapement lever associated therewith, means tending to rotate said wheel, said lever being successively movable with respect to said escapement wheel in two alternative positions, means responsive to said alternative movement of said lever for opening and closing a circuit, thermo-responsive means for controlling the operation of said lever, and means for reenergizing the means tending to rotate said wheel.

4. A circuit controlling device comprising an escapement mechanism including an escapement wheel and an escapement lever associated therewith, means tending to rotate said wheel, said lever being successively movable with respect to said escapement wheel in two alternative positions, means responsive to said alternative movement of said lever for opening and closing a circuit, thermo-responsive means for controlling the operation of said lever, means for reenergizing the means tending to rotate said wheel, and means for adjusting said thermo-responsive means.

5. An electric circuit controlling device comprising an escapement mechanism including an escapement wheel of conductive material having a plurality of spaced protuberances on the periphery thereof, an escapement lever associated therewith having a pair of spaced contact members, successively movable in two alternative positions to engage the protuberances on said escapement wheel to control the flow of current in an electric circuit, resilient means normally maintaining said lever in one of said positions, a thermo-responsive device for controlling the operation of said lever, means tending to rotate said escapement wheel, and thermo-responsive means for reenergizing the means tending to rotate the escapement wheel.

6. In a device for controlling an electric circuit, an escapement mechanism having a power unit, means adapted to co-act with said escapement mechanism for controlling the flow of current through a circuit, and thermo-responsive means for maintaining the power unit of said escapement mechanism active and for actuating said co-acting means.

7. In a device for controlling an electric circuit, an escapement mechansm having a power unit, means adapted to co-act with said escapement mechanism for controlling the flow of current through a circuit, thermo-responsive means for maintaining the power unit of said escapement mechanism active and for actuating said co-acting means, and hand-controlled mechanism for adjusting said thermo-responsive means.

8. In a device for controlling an electric circuit, an escapement mechanism having a power unit, and including mechanism co-acting with the escapement mechanism for controlling the circuit, means for maintaining the power unit active, and thermo-responsive means common both to said means for maintaining the power unit active and to said mechanism co-acting with the escapement mechanism.

9. In a device for controlling an electric circuit, an escapement mechanism having a power unit, and including mechanism co-acting with the escapement mechanism for controlling the circuit, means for maintaining the power unit active, thermo-responsive means common both to said means for maintaining the power unit active and to said mechanism co-acting with the escapement mechanism, and means for adjusting said thermo-responsive means.

10. In a device for controlling an electric circuit, an escapement mechanism included in the circuit, and comprising a pair of escapement wheels, one of which is insulated, conductive means in the circuit adapted to be engaged alternately with said escapement wheels, and thermo-responsive means for controlling said conductive means.

GEORGES BONAME.
ALBERT MUNERELLE.